(12) United States Patent
Itoh

(10) Patent No.: US 8,069,278 B2
(45) Date of Patent: Nov. 29, 2011

(54) DETECTING ABNORMAL HOST ADAPTER OPERATIONS VIA LIGHT EMISSIONS

(75) Inventor: Yasushi Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 105 days.

(21) Appl. No.: 12/564,589

(22) Filed: Sep. 22, 2009

(65) Prior Publication Data

US 2010/0088432 A1    Apr. 8, 2010

Related U.S. Application Data

(63) Continuation of application No. PCT/JP2007/056725, filed on Mar. 28, 2007.

(51) Int. Cl.
*G06F 3/00* (2006.01)
*G06F 11/00* (2006.01)

(52) U.S. Cl. ............... 710/15; 710/16; 710/17; 710/18; 710/19; 714/100

(58) Field of Classification Search .................. None
See application file for complete search history.

(56) References Cited

U.S. PATENT DOCUMENTS

| 6,061,391 | A | * | 5/2000 | Sasaki et al. ............... 375/222 |
| 2001/0054093 | A1 | | 12/2001 | Iwatani |
| 2004/0049633 | A1 | | 3/2004 | Suzuki et al. |

FOREIGN PATENT DOCUMENTS

| JP | 61-115149 | 6/1986 |
| JP | 07-311697 | 11/1995 |
| JP | A 9-128269 | 5/1997 |
| JP | 2000-172576 | 6/2000 |
| JP | 2001-290609 | 10/2001 |
| JP | A 2002-63063 | 2/2002 |
| JP | A 2004-103053 | 4/2004 |
| JP | A 2005-242915 | 9/2005 |

OTHER PUBLICATIONS

Internet; "Common HBA API," online, searched on Mar. 20, 2007; ftp://ftp.t.11.org/t11/docs/02-149v0.pdf.
Internet; "ETERNUS SF Storage Cruiser," online, searched on Mar. 20, 2007; http://storage-system.fujitsu.com/jp/eternus-sf/cruiser/merit/.
Office Action issued by the Patent Office of Japan for corresponding Japanese Patent Application No. 2009-507329, mailed Jun. 21, 2011 (English language translation).

* cited by examiner

*Primary Examiner* — Alan Chen
(74) *Attorney, Agent, or Firm* — Greer, Burns & Crain, Ltd.

(57) ABSTRACT

A server is installed with host bus adapters (HBAs). The HBA causes light-emitting components thereon to emit light in abnormal light emission patterns upon falling into an abnormal condition, and in predetermined light emission patterns upon receiving a predetermined command. A method for managing the HBA includes storing abnormal light emission patterns of the HBA, detecting an abnormality as to whether a predetermined HBA is in an abnormal condition, obtaining current light emission patterns of a light-emitting component of an abnormal HBA which is detected to be in the abnormal condition in the detecting, and controlling light emission by sending the predetermined command to all of the HBAs except the abnormal one to cause the light-emitting components thereof to emit light in the predetermined light emission patterns, when the current light emission patterns, obtained in the obtaining, do not match the abnormal light emission patterns stored in the storing.

4 Claims, 13 Drawing Sheets

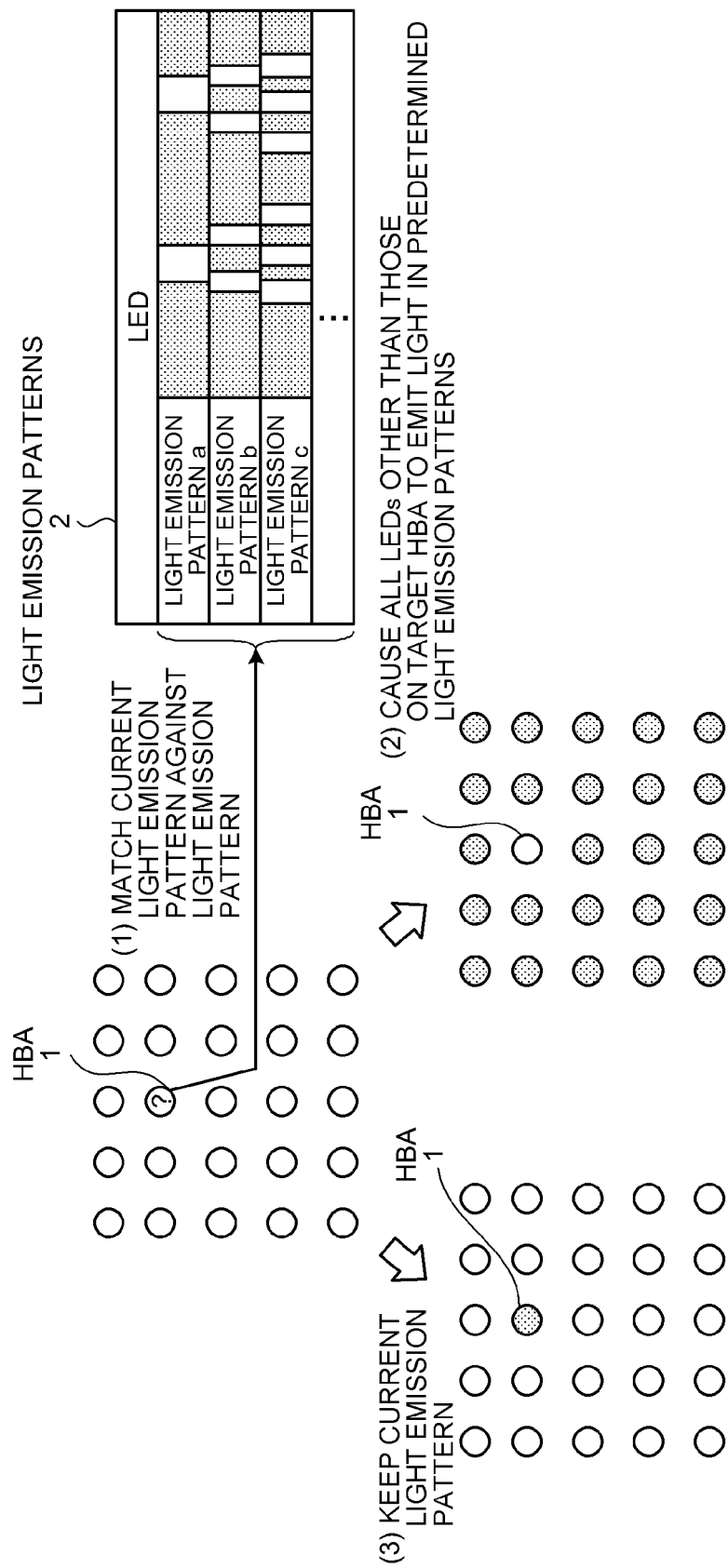

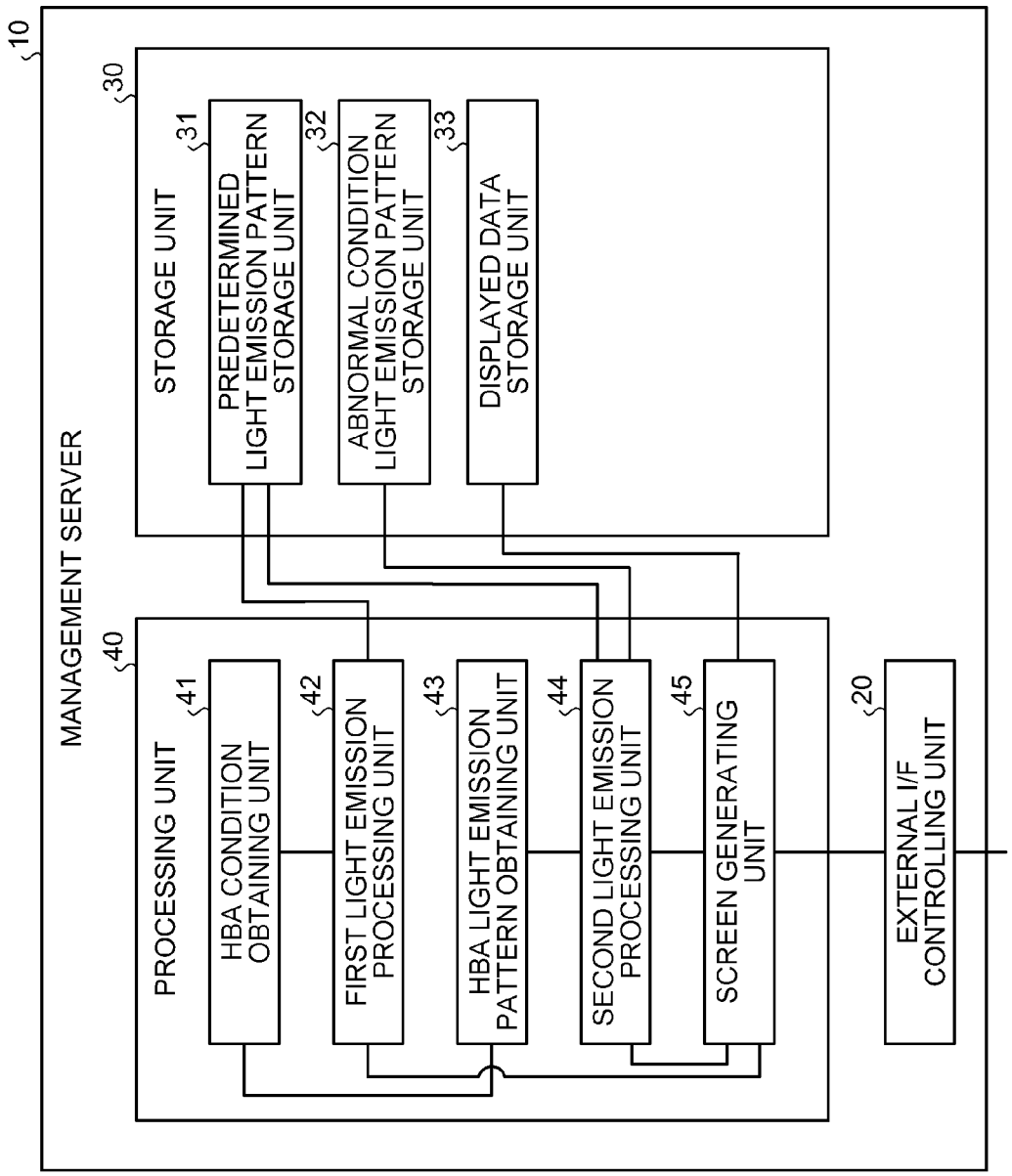

FIG.4

| LED "0" | | LED "1" | |
|---|---|---|---|
| LIGHT EMISSION PATTERN t | | LIGHT EMISSION PATTERN t | |

FIG.5

| LED "0" | | LED "1" | |
|---|---|---|---|
| LIGHT EMISSION PATTERN a | | LIGHT EMISSION PATTERN a | |
| | | LIGHT EMISSION PATTERN b | |
| | | LIGHT EMISSION PATTERN c | |
| LIGHT EMISSION PATTERN b | | LIGHT EMISSION PATTERN a | |
| | | LIGHT EMISSION PATTERN b | |
| | | LIGHT EMISSION PATTERN c | |
| LIGHT EMISSION PATTERN c | | LIGHT EMISSION PATTERN a | |
| | | LIGHT EMISSION PATTERN b | |
| | | LIGHT EMISSION PATTERN c | |
| ⋮ | | ⋮ | |

DETECTING ABNORMAL HOST ADAPTER OPERATIONS VIA LIGHT EMISSIONS

CROSS-REFERENCE TO RELATED APPLICATION(S)

This application is a continuation of PCT international application Ser. No. PCT/JP2007/056725 filed on Mar. 28, 2007 which designates the United States, the entire contents of which are incorporated herein by reference.

FIELD

The embodiments discussed herein are directed to a host bus adapter management program, a computer-readable recording medium storing therein the host bus adapter management program, a host bus adapter management method, and a host bus adapter management apparatus.

BACKGROUND

Recently, in the aim of sharing and consolidating storage resources, a Storage Area Network (SAN) is established using a Fibre Channel (FC) switch connecting servers and storage devices. Upon establishing a SAN, a host bus adapter (HBA) installed in a server is physically connected to a Fiber Channel adapter (FCA) installed in a storage device.

SAN management software enables an operator to manage a SAN by observing an interface graphically displaying physical connections between devices (servers, FC switches, and storage devices) in the SAN, or access path definitions (logical connections) on a screen of a terminal device. For example, Japanese Laid-open Patent Publication No. 2002-063063 and an online document "ETERNUS SF Storage Cruiser" (searched on Mar. 20, 2007 at the URL http://storage-system.fujitsu.com/jp/eternus-sf/cruiser/merit/) disclose a SAN management system using such SAN management software. An access path herein means a logical connection that allocates a storage resource to a server over a SAN. An HBA and a FCA are generally connected logically in a one-to-one relationship. As disclosed in another online document "Common HBA API" (searched on Mar. 20, 2007 at URL ftp://ftp.t11.org/t11/docs/02-149v0.pdf), some of the SAN management software have a function to enable an access path definition to be automatically set in a new HBA when a logical connection between an existing HBA and a FCA is lost, e.g., when an HBA fails and is replaced with a new one.

Such SAN management software has a function to cause LEDs on an HBA to emit light in predetermined light emission patterns so that a user can visually recognize and distinguish the HBA from others. Such a function has been used for enabling a field engineer to visually identify the physical location of a specific HBA. For example, the function has been used by a field engineer upon inspecting or replacing an HBA while the chassis of a server is actually opened. More specifically, when the SAN management software receives a request for identifying the physical location of an HBA from an administrator, the SAN management software issues a predetermined command to an HBA driver that controls the HBA. In response to the received request, the HBA driver controls the LEDs on the HBA to emit light in specific patterns. Japanese Laid-open Patent Publication No. 2004-103053 and Japanese Laid-open Patent Publication No. 2005-242915, for example, disclose a technology that allows a field engineer to visually recognize and distinguish a part from others in an apparatus having a plurality of parts emitting light from light-emitting components thereof.

However, these conventional technologies do not allow the physical location of a failed HBA to be identified. More specifically, when the SAN management software receives a request for identifying a physical location of an HBA from the administrator, the SAN management software outputs a command to cause the LEDs on the HBA to emit light in specific patterns; however, if the HBA is in an abnormal condition and failed in the first place, the HBA may not operate according to the command. In such a situation, the light emission patterns do not allow a field engineer to visually recognize and distinguish the HBA from others, thus preventing the engineer actually being on-site from identifying the physical location of the failed HBA.

SUMMARY

According to an aspect of the invention, a computer readable storage medium stores a host bus adapter management program. The host bus adapter management program makes a computer that is a management apparatus connected to a server installed with a plurality of host bus adapters that causes light-emitting components thereon to emit light in abnormal light emission patterns indicating an abnormal condition upon falling into the abnormal condition, and to emit light in predetermined light emission patterns corresponding to a predetermined command upon receiving the command, perform: storing abnormal light emission patterns of the host bus adapters; detecting an abnormality as to whether a predetermined host bus adapter is in an abnormal condition; obtaining current light emission patterns of a light-emitting component of an abnormal host bus adapter which is detected to be in the abnormal condition in the detecting, the current light emission patterns representing patterns of actual light emission by a light-emitting component; and controlling light emission by sending the predetermined command to all of the host bus adapters installed in the server except the abnormal host bus adapter to cause the light-emitting components thereof to emit light in the predetermined light emission patterns, when the current light emission patterns, obtained in the obtaining, do not match the abnormal light emission patterns stored in the storing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic for explaining an overview and a characteristic of a management server included in the SAN management system according to the first embodiment;

FIG. 3 is a block diagram of the management server depicted in FIG. 1;

FIG. 4 is a schematic of an example of information stored in a predetermined light emission pattern storage unit depicted in FIG. 3;

FIG. 5 is a schematic of an example of information stored in an abnormal condition light emission pattern storage unit depicted in FIG. 3;

DESCRIPTION OF EMBODIMENTS

Embodiments of a SAN management system including a management server according to the present invention will now be described in detail with reference to the accompanying drawings. The description will start by explaining terminologies, and descriptions of an overview and a characteristic of a SAN management system according to a first embodiment of the present invention will follow. Then, a structure of the management server and that of an application server included in the SAN management system will be described. After explaining a flow of a process performed by the management server, effects of the first embodiment will be explained, and descriptions of other embodiments will follow.

[a] First Embodiment

[Explanation of Terminologies]

To begin with, main terminologies used in the descriptions of the embodiments will be explained. A Storage Area Network (SAN) is a network of a plurality of servers and a plurality of storage devices connected over a Fibre Channel (FC) switch. More specifically, a host bus adapter (HBA) installed in a server is connected to a Fibre Channel adapter (FCA) installed in a storage device via a FC switch (see FIG. 1). In such a SAN, an access path can be defined. An access path is a logical connection that enables storage resources in the network to be efficiently allocated to the servers, to be shared, and to be centrally managed.

An HBA (corresponding to the host bus adapter mentioned in the appended claims) is installed in a server in a plurality. When an HBA falls into an abnormal condition, the HBA causes LEDs provided thereon to emit light in light emission patterns indicating such an abnormal condition. In addition, upon receiving a predetermined command or an application program interface (API), the HBA causes the LEDs to emit light in light emission patterns corresponding to the command or the API.

Light emission patterns (corresponding to the "abnormal light emission patterns" or the "predetermined light emission patterns" mentioned in the appended claims) are cyclic emissions of light following a predetermined regularity (being ON or OFF, or blinking). Each of the devices recognizes such a light emission pattern as unique identification information commonly identified among such devices. To explain it with a specific example, when light is turned ON twice within a cycle, a device recognizes the pattern as a light emission pattern "a"; and when light is turned ON twice in a shorter interval and the interval is repeated twice, a device recognizes the pattern as a light emission pattern "b" (see light emission patterns 2 depicted in FIG. 2).

[Overview and Characteristic of SAN Management System]

Figure 1:
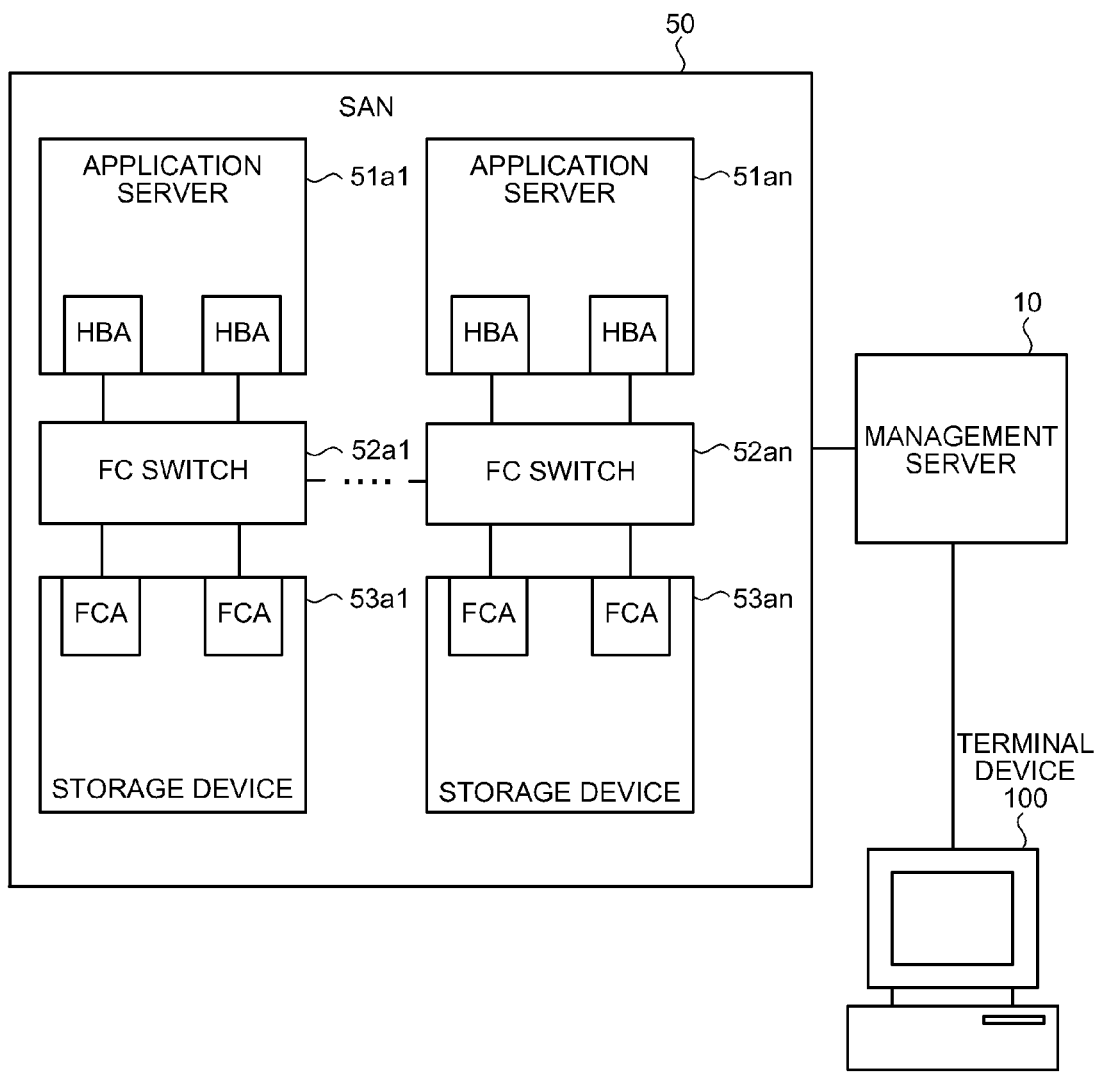
FIG. 1 is a schematic for explaining a structure of a SAN management system according to a first embodiment of the present invention.

The SAN management system according to the first embodiment will now be explained with reference to FIGS. 1 and 2. FIG. 1 is a schematic for explaining a structure of the SAN management system according to the first embodiment. FIG. 2 is a schematic for explaining an overview and a characteristic of a management server included in the SAN management system according to the first embodiment.

An overview of the SAN management system according to the first embodiment will now be explained. As depicted in FIG. 1, the SAN management system includes a management server 10, a SAN 50, and a terminal device 100. The management server 10 collects information from each of the devices included in the SAN 50 (application servers 51*a*1 to 51*an*, FC switches 52*a*1 to 52*an*, and storage devices 53*a*1 to 53*an*). The management server 10 also responds to various requests issued by the terminal device 100, while displaying physical connections between the devices or access path definitions on a display of the terminal device 100 (see FIGS. 6 to 8). A main characteristic of the SAN management system is in that the management server 10 enables a field engineer to identify the physical location of a failed HBA.

To explain the main characteristic, the management server 10 stores therein light emission patterns that indicate abnormal conditions of an HBA in the SAN management system. More specifically, as depicted in FIG. 2, the management server 10 stores therein the light emission patterns 2 that are various light emission patterns of LEDs on an HBA that is in an abnormal condition.

The management server 10 detects whether a predetermined HBA is in an abnormal condition. More specifically, when the management server 10 receives a request for identifying the physical location of the HBA, the management server 10 inquires an application server 51*ax* in which the predetermined HBA is installed of the condition of the HBA, using a predetermined command.

The management server 10 then obtains current light emission patterns of the LEDs on the abnormal HBA. More specifically, if the management server 10 receives information indicating that the inquired HBA is in an abnormal condition from the application server 51*ax*, the management server 10 then inquires the application server 51*ax* of the current light emission patterns of the LEDs on the HBA, using a predetermined command.

If the current light emission patterns are not those stored as light emission patterns indicating abnormal conditions of an HBA, the management server 10 issues a predetermined command to all of the HBAs installed in the application server 51*ax* excluding the abnormal one to control LEDs thereon to emit light in predetermined light emission patterns. More specifically, as depicted in FIG. 2, if the management server 10 receives the current light emission patterns of the LEDs on an HBA 1 from the application server 51*ax*, the management server 10 checks the current light emission patterns for matching against the light emission patterns 2 (see Step (1) in FIG. 2). As a result of checking the current light emission patterns for matching against the light emission patterns 2, if the current light emission patterns are not in the light emission patterns 2, the LEDs on all of the HBAs excluding the ones on the HBA 1 are caused to emit light in predetermined light emission patterns (see Step (2) in FIG. 2). On the contrary, if the current light emission patterns are found in the light emission patterns 2, the LEDs on the HBA are kept in the current light emission patterns (see Step (3) in FIG. 2). In FIG.

2, twenty five circles, arranged in five rows and five columns, are conceptual representation of all of the HBAs installed in the application server 51*ax*. An HBA, having LEDs emitting light in predetermined light emission patterns or the current light emission patterns, is conceptually represented by hatching a circle corresponding thereto.

In this manner, the management server 10 enables a field engineer to identify the physical location of a failed HBA, as mentioned as the main characteristic of the SAN management system according to the first embodiment.

[Structure of Management Server]

A structure of the management server 10 will now be explained with reference to FIG. 3. FIG. 3 is a block diagram of the management server 10. As depicted in FIG. 3, the management server 10 includes an external interface (I/F) controlling unit 20, a storage unit 30, and a processing unit 40.

The external I/F controlling unit 20 controls communications with the application servers 51*a*1 to 51*an* and the terminal device 100. More specifically, if the external I/F controlling unit 20 receives information or an instruction for the application servers 51*a*1 to 51*an* or the terminal device 100, the external I/F controlling unit 20 outputs the information or the instruction to a transmission channel connected to each of such devices. In addition, if the external I/F controlling unit 20 receives information or a response from the application servers 51*a*1 to 51*an* or the terminal device 100, the external I/F controlling unit 20 outputs the information or the response to the processing unit 40.

The storage unit 30 stores therein data and like used for various processes performed by the processing unit 40. As elements particularly relevant to the present invention, the storage unit 30 includes a predetermined light emission pattern storage unit 31, an abnormal condition light emission pattern storage unit 32, and a displayed data storage unit 33. The abnormal condition light emission pattern storage unit 32 corresponds to the "storing abnormal light emission patterns" mentioned in the appended claims.

The predetermined light emission pattern storage unit 31 stores therein light emission patterns that are used for identifying the physical location of an HBA in a normal condition. More specifically, as depicted in FIG. 4, the predetermined light emission pattern storage unit 31 stores therein combinations of light emission patterns of a LED "0" and that of a LED "1". For example, as depicted in FIG. 4, the predetermined light emission pattern storage unit 31 stores therein a light emission pattern "t" for both of the LED "0" and the LED "1". The light emission pattern "t" includes two short ON periods, a long ON period, and then two short ON periods. Each of the HBAs installed in the application servers 51*a*1 to 51*an* is provided with two LEDs with identification information (the LED "0" and the LED "1"), and a combination of light emission patterns of these LEDs indicates a predetermined meaning. FIG. 4 is a schematic of an example of the information stored in the predetermined light emission pattern storage unit 31.

The abnormal condition light emission pattern storage unit 32 stores therein light emission patterns indicating abnormal conditions of an HBA. More specifically, as depicted in FIG. 5, the abnormal condition light emission pattern storage unit 32 stores therein every combination of light emission patterns of the LED "0" and those of the LED "1" for each type of abnormal conditions. When an HBA falls into an abnormal condition, the LEDs provided thereon emit light according to these light emission patterns. For example, as depicted in FIG. 5, the abnormal condition light emission pattern storage unit 32 stores therein a combination of a light emission pattern "a" and a light emission pattern "b". In the light emission pattern "a", the LED "0" is turned ON twice in a cycle; and in the light emission pattern "b", the LED "1" is turned ON twice in a shorter interval, and the interval is repeated twice in a cycle. (These may be the light emission patterns in which the LEDs are caused to emit light when the HBA having the LEDs is disconnected from a FC switch.) FIG. 5 is a schematic of an example of the information stored in the abnormal condition light emission pattern storage unit 32.

The displayed data storage unit 33 stores therein data for generating graphics to be presented on a display of the terminal device 100. More specifically, the displayed data storage unit 33 stores therein data used by a screen generating unit 45 to be described later. Such data is used for displaying graphical representations of physical connections or access paths between the devices included in the SAN 50 (the application servers, FC switches, and storage devices).

The processing unit 40 has an internal memory for storing therein computer programs specifying various procedures or control data. The processing unit 40 is a processor that performs various operations thereby. As elements particularly relevant to the present invention, the processing unit 40 includes an HBA condition obtaining unit 41, a first light emission processing unit 42, an HBA light emission pattern obtaining unit 43, a second light emission processing unit 44, and the screen generating unit 45. The HBA condition obtaining unit 41 corresponds to the "detecting an abnormality" in the appended claims; the HBA light emission pattern obtaining unit 43 corresponds to the "obtaining current light emission patterns" of the same; the second light emission processing unit 44 corresponds to the "the controlling" in the appended claims; and the screen generating unit 45 corresponds to the "alarming" as mentioned in the appended claims.

The HBA condition obtaining unit 41 functions to detect whether an HBA is in an abnormal condition. More specifically, when the HBA condition obtaining unit 41 receives a request for identifying the physical location of a predetermined HBA from the terminal device 100 via the external I/F controlling unit 20, the HBA condition obtaining unit 41 inquires the application server 51*ax* in which the HBA is installed of the condition of the HBA using a predetermined command. Upon receiving a response indicating that the HBA is in a normal condition from the application server 51*ax*, the HBA condition obtaining unit 41 outputs a signal that instructs the first light emission processing unit 42, to be described later, to start a process thereof. Upon receiving a response indicating that the HBA is in an abnormal condition from the application server 51*ax*, the HBA condition obtaining unit 41 outputs a signal that instructs the HBA light emission pattern obtaining unit 43, to be described later, to start a process thereof.

The first light emission processing unit 42 functions to identify the physical location of an HBA under a normal condition. More specifically, upon receiving the signal that instructs the first light emission processing unit 42 to start the process thereof from the HBA condition obtaining unit 41, the first light emission processing unit 42 reads the light emission pattern of the LED "0" and that of the LED "1" from the predetermined light emission pattern storage unit 31. The first light emission processing unit 42 then appends the identification information of the LEDs to each of the read light emission patterns, and transmits the light emission patterns to the application server 51*ax* via the external I/F controlling unit 20. The first light emission processing unit 42 then outputs a signal that instructs the screen generating unit 45 to update the screen together with the read light emission patterns to the screen generating unit 45 to be described later. The first light emission processing unit 42 then either receives a request for causing the LEDs to stop emitting light from the terminal device 100 via the external I/F controlling unit 20, or transmits a command to the application server 51ax to stop the light emission patterns when a predetermined amount of time elapses.

For the abnormal HBA whose condition is detected to be abnormal, the HBA light emission pattern obtaining unit 43 obtains the current light emission patterns that indicate the current light emission patterns of the LEDs on the abnormal HBA. More specifically, upon receiving the signal that instructs the HBA light emission pattern obtaining unit 43 to start the process thereof from the HBA condition obtaining unit 41, the HBA light emission pattern obtaining unit 43 inquires the application server 51ax of the current light emission patterns of the LEDs on the abnormal HBA using a predetermined command. Upon receiving a response of the current emission patterns from the application server 51ax, the HBA light emission pattern obtaining unit 43 outputs the current light emission patterns to the second light emission processing unit 44 to be described later. For example, when the HBA light emission pattern obtaining unit 43 receives the light emission pattern "a" appended with the identification information of the LED "0" and the light emission pattern "b" appended with the identification information of the LED "1" from the application server 51ax via the external I/F controlling unit 20, the HBA light emission pattern obtaining unit 43 outputs each of these light emission patterns to the second light emission processing unit 44 as the current light emission patterns.

If the current light emission patterns do not match any of the light emission patterns stored in the abnormal condition light emission pattern storage unit 32, the second light emission processing unit 44 issues a predetermined command to all of the HBAs installed in the application server 51ax, except for the abnormal one, to control the LEDs thereon to emit light in predetermined light emission patterns. More specifically, upon receiving the current light emission patterns from the HBA light emission pattern obtaining unit 43, the second light emission processing unit 44 checks the current light emission patterns for matching against the light emission patterns stored in the abnormal condition light emission pattern storage unit 32. If the result of checking of matching indicates that the current light emission patterns do not match any of the light emission patterns stored in the abnormal condition light emission pattern storage unit 32, the second light emission processing unit 44 reads the light emission patterns of the LED "0" and the LED "1" from the predetermined light emission pattern storage unit 31. The first light emission processing unit 42 then appends the identification information of the LEDs to each of the read light emission patterns, and transmits the light emission patterns to the application server 51ax via the external I/F controlling unit 20. The second light emission processing unit 44 also outputs a signal that gives an instruction for updating the screen to the screen generating unit 45 together with the read light emission patterns. The second light emission processing unit 44 then either receives a request for causing the LEDs to stop emitting light from the terminal device 100 via the external I/F controlling unit 20, or transmits a command to the application server 51ax to stop the light emission patterns when a predetermined amount of time elapses.

On the contrary, if the result of checking of matching indicates that the current light emission patterns match the light emission patterns stored in the abnormal condition light emission pattern storage unit 32, the second light emission processing unit 44 outputs a signal to the screen generating unit 45 to instruct thereto to update a screen, together with the current light emission patterns.

Figure 6:
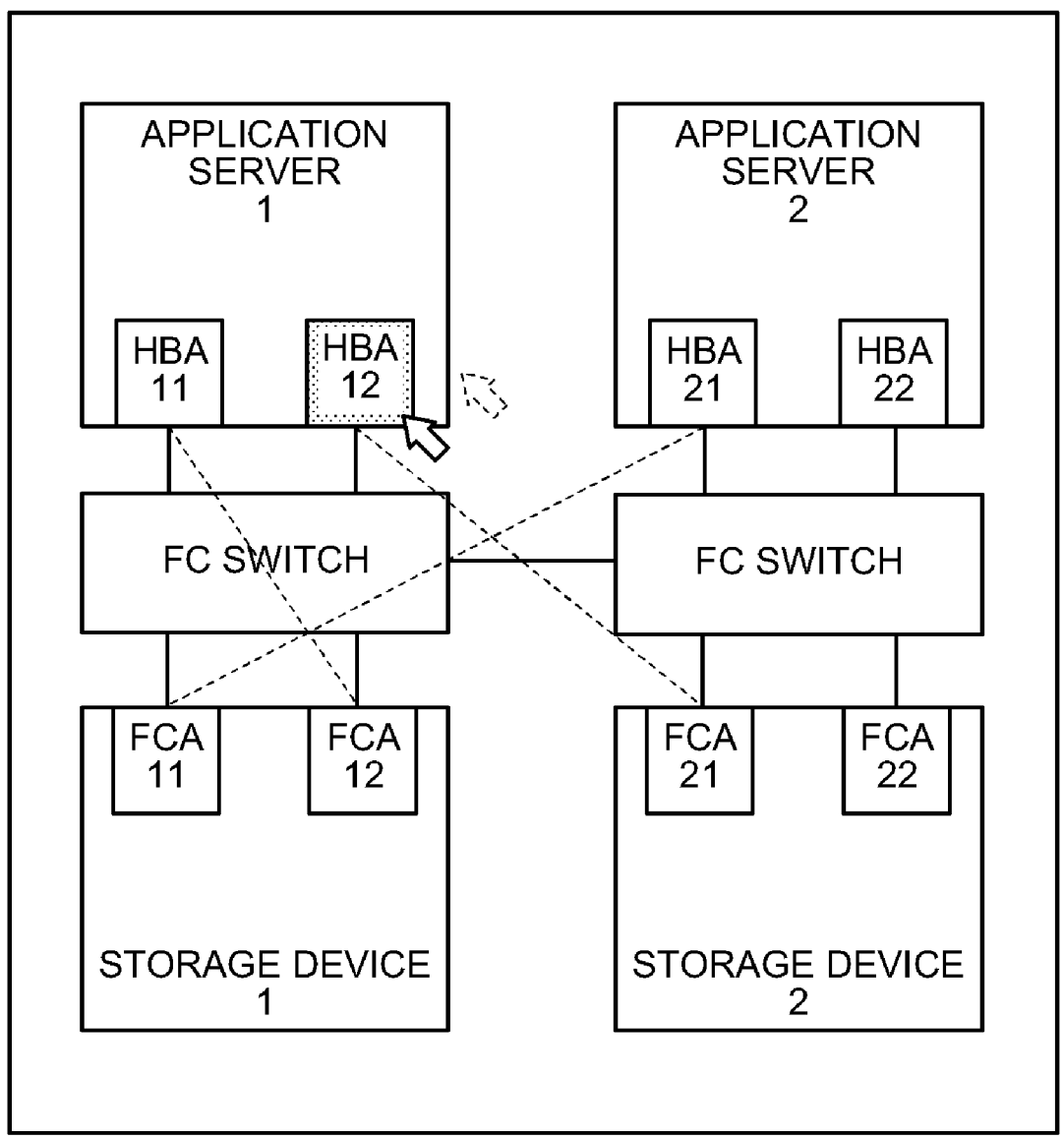
FIG. 6 is an example of a screen displayed on a display of a terminal device depicted in FIG. 1.

The screen generating unit 45 generates graphics to be displayed on the display of the terminal device 100. More specifically, the screen generating unit 45 generates graphics corresponding to the current condition based on the data stored in the displayed data storage unit 33, and outputs the graphics to the terminal device 100. To explain it with a specific example, as depicted in FIG. 6, the screen generating unit 45 generates a block diagram to be displayed on the terminal device 100. In the block diagram, each of the devices in the SAN 50 is represented as an area surrounded by lines in which: physical connections therebetween are represented in full lines; and access path therebetween are represented in dotted lines. The screen generating unit 45 then outputs the graphics to the terminal device 100. The screen generating unit 45 assigns the identification information, actually being assigned to the HBAs in the application servers 51a1 to 51an, to the HBAs on the block diagram on the screen (the identification information will be explained in detail in the section of Structure of Application Servers). In this manner, user operations by way of Graphical User Interface (GUI) can be performed on the terminal device 100, allowing an operator to move a pointer to a section of an HBA using a mouse, to click to send a request (identification information of the HBA) for identifying the physical location of the HBA to the management server 10.

Figure 7:
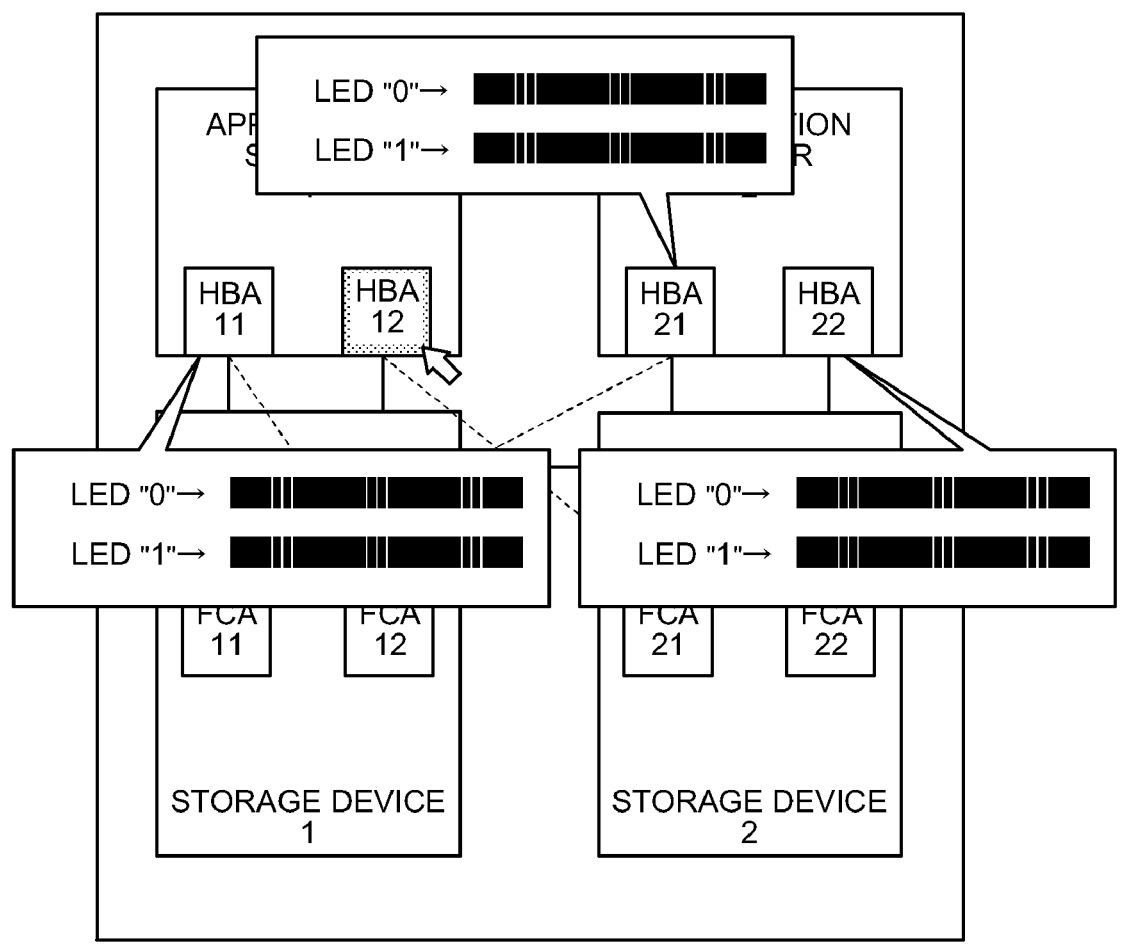
FIG. 7 is another example of the screen displayed on the display of the terminal device depicted in FIG. 1.

The screen generating unit 45 also functions to alarm, when LEDs on an HBA that is not abnormal is caused to emit light in the predetermined light emission patterns, that the LEDs are emitting light in the predetermined light emission patterns. More specifically, upon receiving the light emission patterns or the signal instructing thereto to update the screen, the screen generating unit 45 generates visual representations of the light emission patterns using the data stored in the displayed data storage unit 33, generates graphics indicating that the LEDs on the HBA that is not abnormal are emitting light in the light emission patterns, and outputs the graphics to the terminal device 100. For example, as depicted in FIG. 7, the screen generating unit 45 generates balloons near the blocks representing the HBAs, except for the HBA having the identification information "12", on the screen, and creates graphics in which the light emission patterns are depicted in the balloons.

Figure 8:
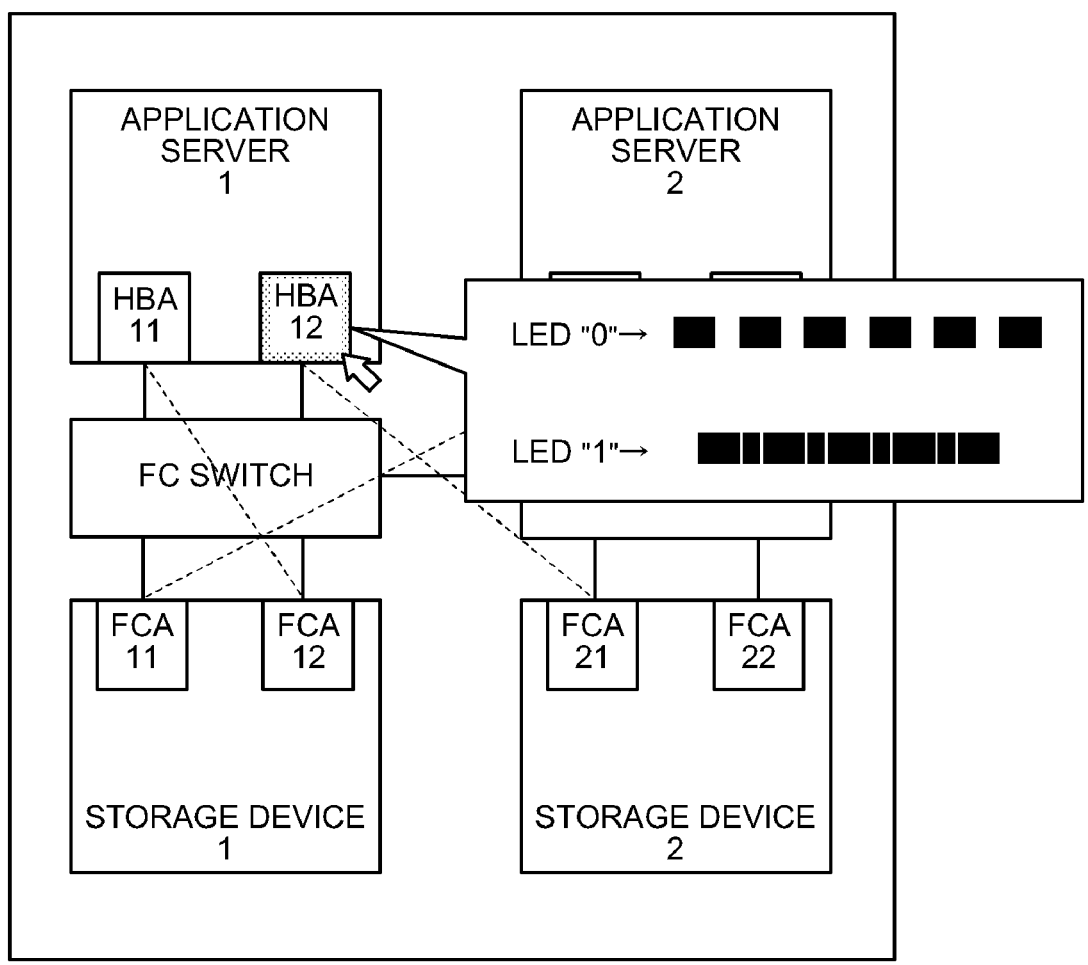
FIG. 8 is still another example of the screen displayed on the display of the terminal device depicted in FIG. 1.

For example, in FIG. 8, it is assumed that a request is issued to determine the physical location of the HBA having the identification information of "12"; such an HBA is in an abnormal condition; and the current light emission patterns of the LEDs on the HBA are in the abnormal condition light emission pattern storage unit 32. In this scenario, if the screen generating unit 45 receives the current light emission patterns (the light emission patterns in which LEDs on the HBA are caused to emit light when the HBA falls into an abnormal condition) and the instructions for updating the screen, the screen generating unit 45 generates the balloons near the blocks representing the HBA having the identification information "12" on the screen, and creates graphics in which the light emission pattern are visually depicted in the balloons. FIGS. 6 to 8 are schematics of examples of the screens displayed on the display of the terminal device 100.

[Structure of Application Server]

Figure 9:
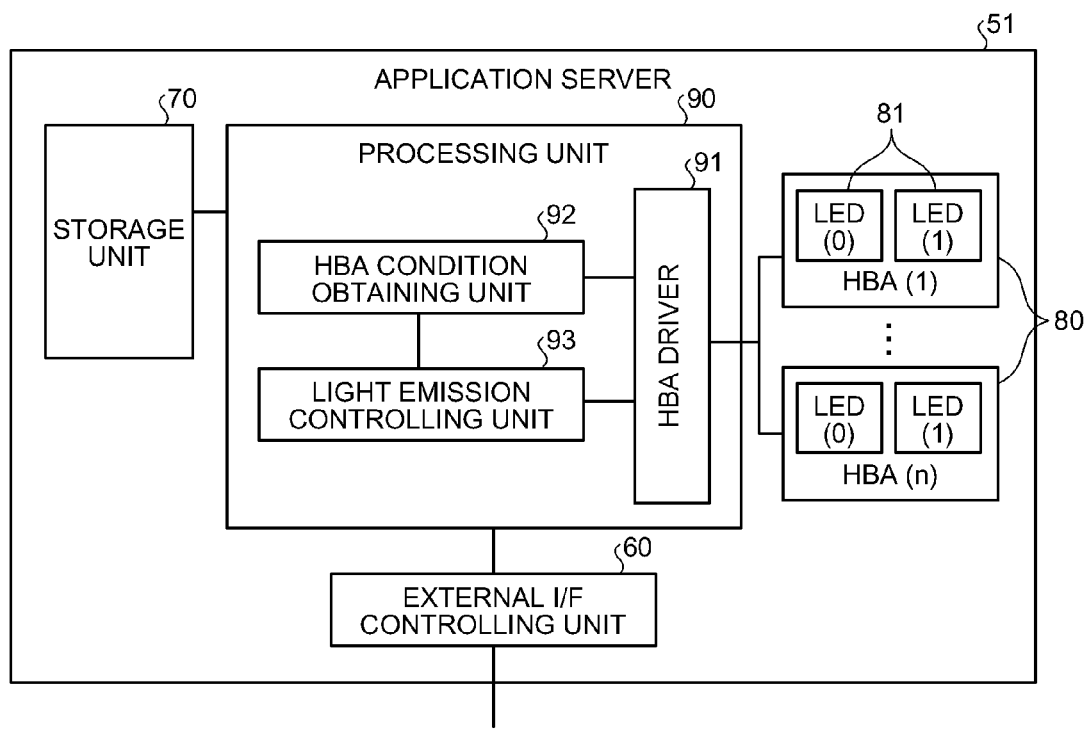
FIG. 9 is a block diagram of an application server included in the SAN management system according to the first embodiment depicted in FIG. 1.

A structure of an application server 51 is explained with reference to FIG. 9. FIG. 9 is a block diagram of the application server 51. As depicted in FIG. 9, the application server 51 includes an external I/F controlling unit 60, a storage unit 70 that stores therein data used for various processes performed by a processing unit 90, an HBA 80 having LEDs 81, and the processing unit 90.

The external I/F controlling unit 60 controls communications with the management server 10. More specifically, upon receiving a response destined to the management server 10 from the processing unit 90, the external I/F controlling unit 60 outputs the response to the communication channel connected to the management server 10. Upon receiving information or an instruction from the management server 10, the external I/F controlling unit 60 outputs the information or the instruction to the processing unit 90.

The HBA 80 controls the LEDs 81 to emit light in specific light emission patterns. More specifically, upon falling into an abnormal condition, the HBA 80 causes the LEDs 81 to emit light in the light emission patterns representing such an abnormal condition. In addition, upon receiving a predetermined API, the HBA 80 causes the LEDs 81 to emit light in the light emission patterns corresponding thereto. The HBA 80 is assigned with identification information that uniquely identifies the HBA. Two of the LEDs 81 are also assigned with identification information (LED "0" and LED "1", respectively).

The processing unit 90 has an internal memory for storing therein computer programs specifying various procedures and control data. The processing unit 90 is a processor that performs various operations thereby. Especially in a close relationship with the present invention, the processing unit 40 includes an HBA driver 91, an HBA condition obtaining unit 92, and a light emission controlling unit 93.

The HBA driver 91 controls the HBA 80 based on an API issued by each of these elements. More specifically, upon receiving an API related to obtaining information about the HBA 80 from the HBA condition obtaining unit 92 to be described later, the HBA driver 91 obtains various information about the HBA 80, and returns the same. In addition, upon receiving an API to cause the HBA 80, specified by the identification information thereof, to emit light in predetermined light emission patterns from the light emission controlling unit 93 to be described later, the HBA driver 91 controls the corresponding HBA 80 to cause the LEDs 81 to emit light in the predetermined light emission pattern.

Figure 10:
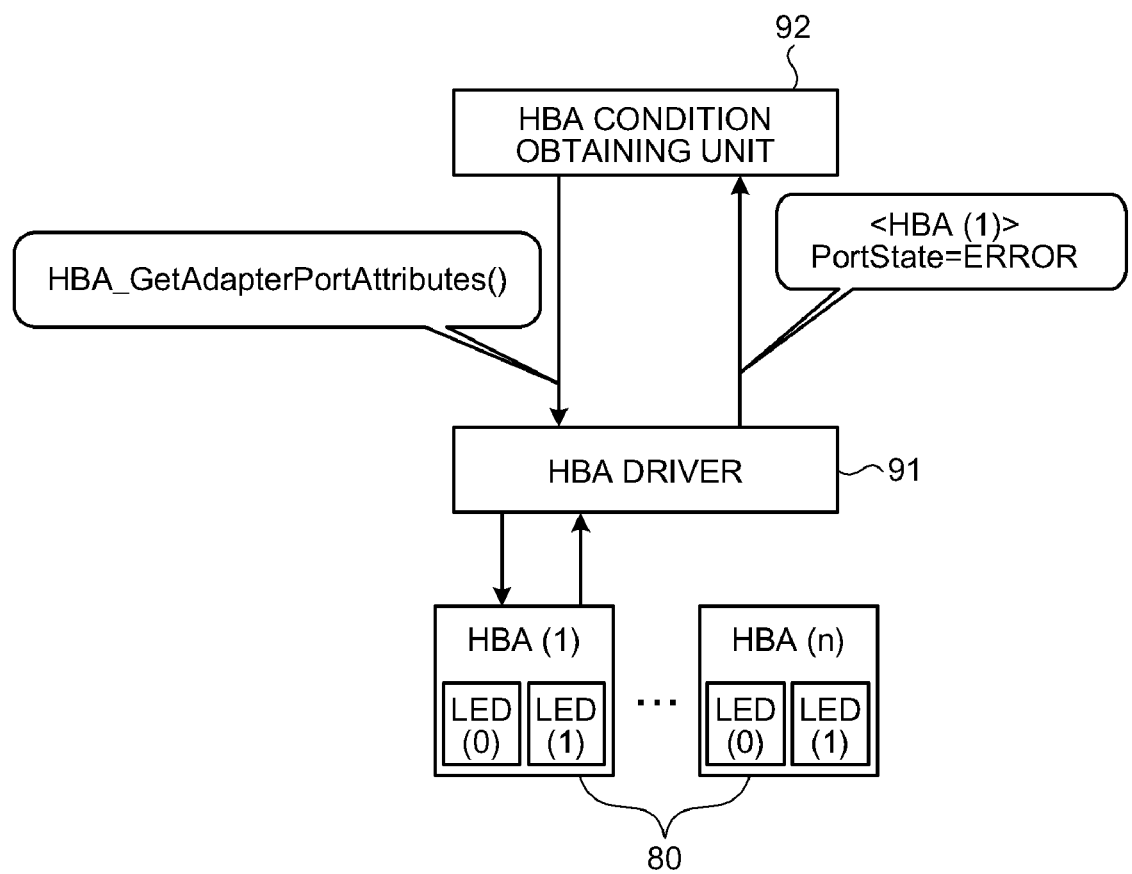
FIG. 10 is a schematic for explaining a process performed by an HBA condition obtaining unit in the application server depicted in FIG. 9.

The HBA condition obtaining unit 92 obtains a condition of the HBA 80 that is designated by the management server 10. More specifically, upon receiving a command inquiring the condition of the HBA 80, specified by identification information thereof, from the management server 10 via the external I/F controlling unit 60, the HBA condition obtaining unit 92 outputs an API for obtaining the information of the HBA 80 to the HBA driver 91. Upon receiving the condition of the HBA 80 from the HBA driver 91, the HBA condition obtaining unit 92 transmits the same to the management server 10 via the external I/F controlling unit 60. The HBA condition obtaining unit 92 then outputs the condition and the identification information of the HBA 80 to the light emission controlling unit 93, to be described later. For example, FIG. 10 is a schematic for explaining a process performed by the HBA condition obtaining unit 92 in the application server. As depicted in FIG. 10, the HBA condition obtaining unit 92 outputs the API "HBA GetAdapterPortAttributes( )" to the HBA driver 91 to obtain information about the HBA 80. The HBA condition obtaining unit 92 then receives a response "PortState=ERROR" from the HBA 80 having the identification information "1" via the HBA driver 91. The API "HBA GetAdapterPortAttributes( )" is one of the APIs, proposed by the Storage Networking Industry Association (SNIA) used for obtaining information about an HBA. The "PortState" is one of the attribute values obtained by executing the API. The "ERROR" is one of the responses indicating an abnormal condition.

Figure 11:
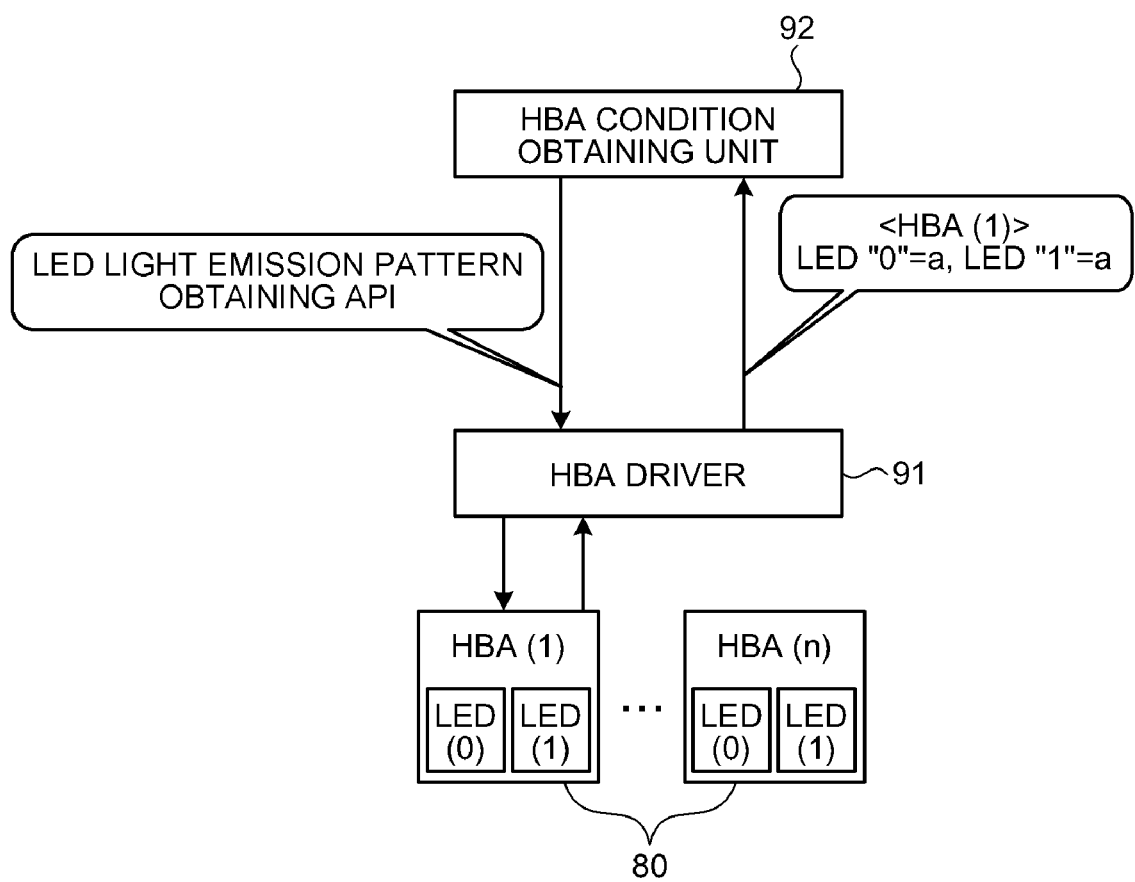
FIG. 11 is a schematic for explaining a process performed by the HBA condition obtaining unit in the application server depicted in FIG. 9.

Upon receiving a command inquiring the current light emission patterns from the management server 10 via the external I/F controlling unit 60, the HBA condition obtaining unit 92 outputs the API for obtaining the light emission patterns of the LEDs 81 on the abnormal HBA 80 to the HBA driver 91. Upon receiving the current light emission patterns from the HBA driver 91, the HBA condition obtaining unit 92 transmits the same to the management server 10 via the external I/F controlling unit 60. For example, FIG. 11 is a schematic for explaining a process performed by the HBA condition obtaining unit 92 in the application server. As depicted in FIG. 11, the HBA condition obtaining unit 92 outputs the API for obtaining the light emission patterns of the LEDs to the HBA driver 91. In response, the HBA condition obtaining unit 92 receives a response of LED "0"=a, and LED "1"=a from the HBA 80 having the identification information "1" via the HBA driver 91.

The light emission controlling unit 93 controls emission of the light of the LEDs 81 on the HBA 80. More specifically, upon receiving the identification information of the HBA 80 and the condition thereof from the HBA condition obtaining unit 92, the light emission controlling unit 93 controls as to which LEDs on which of the HBAs 80 are to emit light, using the light emission patterns transmitted later from the management server 10, depending on whether the condition of the HBA is "abnormal" or "normal". For example, the light emission controlling unit 93 receives the identification information "1" and the condition "abnormal" from the HBA condition obtaining unit 92. The light emission controlling unit 93 then receives the light emission pattern "a" appended with the identification information of the LED "0" and the light emission pattern "b" appended with the identification information of the LED "1" from the management server 10 via the external I/F controlling unit 60. In response, the light emission controlling unit 93 outputs an API to the HBA driver 91 to cause all of the LEDs 81 on the HBAs 80 other than those on the HBA 80 with the identification information "1" to emit light in each of the light emission patterns. On the contrary, the light emission controlling unit 93 receives the identification information "1" and the condition "normal" from the HBA condition obtaining unit 92. The light emission controlling unit 93 then receives the light emission pattern "a" appended with the identification information of the LED "0" and the light emission pattern "b" appended with the identification information of the LED "1" from the management server 10 via the external I/F controlling unit 60. In response, the light emission controlling unit 93 outputs an API to the HBA driver 91 to cause the LEDs 81 on the HBA 80 having the identification information "1" to emit light in each of the light emission patterns.

[Process Performed by Management Server]

Figure 12A:
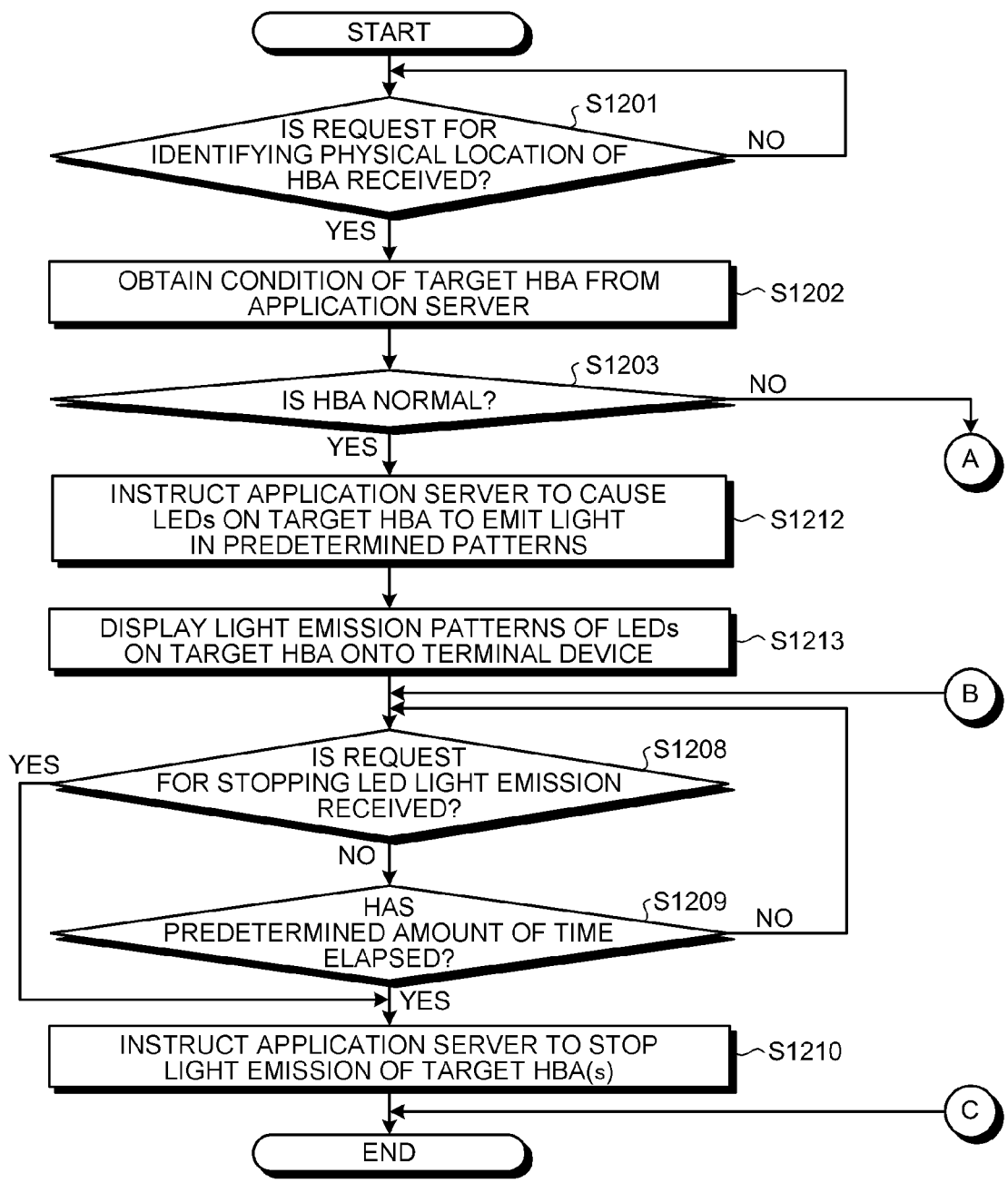
FIGS. 12A and 12B are flowcharts of a process performed by the management server depicted in FIG. 3.
Figure 12B:
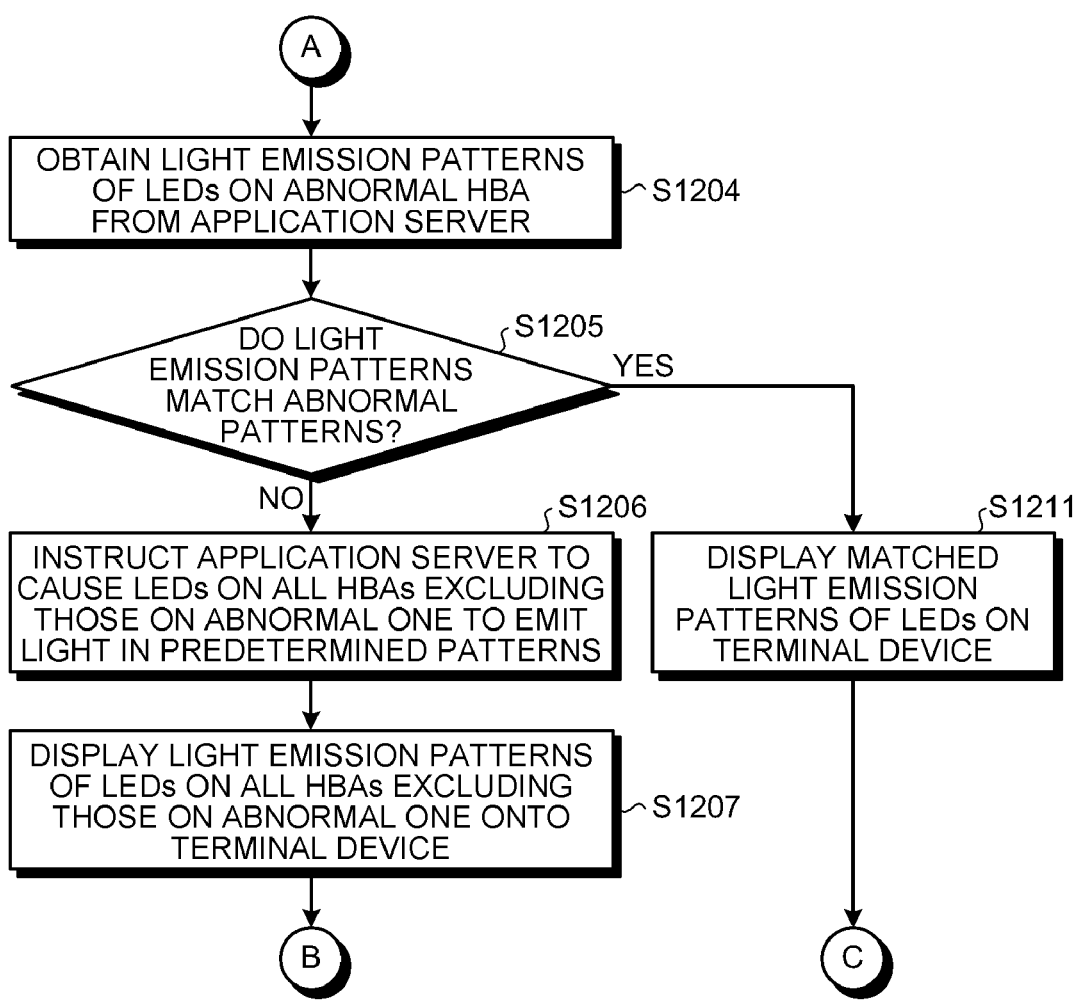

A process performed by the management server 10 will now be explained with reference to FIGS. 12A and 12B. FIGS. 12A and 12B are flowcharts of the process performed by the management server 10.

As depicted in FIGS. 12A and 12B, upon receiving a request for identifying the physical location of a predetermined HBA from the terminal device 100 (YES at Step S1201), the management server 10 causes the HBA condition obtaining unit 41 to inquire the application server 51ax in which the HBA is installed of the condition of the HBA, using a predetermined command. In response, the management server 10 receives the condition of the HBA (Step S1202).

If the condition of the HBA is abnormal (NO at Step S1203), the management server 10 causes the HBA light emission pattern obtaining unit 43 to inquire the application server 51ax of the current light emission patterns of the LEDs on the abnormal HBA, using a predetermined command, to obtain the current light emission patterns of the LEDs (Step S1204).

The management server 10 then causes the second light emission processing unit 44 to check the obtained current light emission patterns for matching against the light emission patterns stored in the abnormal condition light emission pattern storage unit 32. If the current light emission patterns do not match any of the light emission patterns (NO at Step S1205), the management server 10 transmits the light emission patterns read from the predetermined light emission pattern storage unit 31 to the application server 51ax (Step S1206). The management server 10 then causes the screen generating unit 45 to generate graphics for displaying the light emission patterns of the LEDs on all of the HBAs other than the abnormal one, and transmits the graphics to the terminal device 100 (Step S1207).

If the management server 10 receives a request for stopping the light emission of the LEDs from the terminal device 100 (YES at Step S1208), or if the management server 10 does not receive the request for stopping the light emission of the LEDs (No at Step 51208) and a predetermined amount of time elapses (YES at Step S1209), the emissions of the light from the LEDs are stopped (Step S1210), and the process is ended.

On the contrary, if the light emission patterns matching the current light emission patterns are found as a result of the checking of matching performed by the second light emission processing unit 44 (YES at Step S1205), the management server 10 causes the screen generating unit 45 to generate graphics for displaying the current light emission patterns of the LEDs on the abnormal LED, outputs the graphics to the terminal device 100 (Step S1211), and ends the process.

Referring back to Step S1203, if the condition of the HBA is normal (YES at Step S1203), the management server 10 causes the first light emission processing unit 42 to read the light emission patterns from the predetermined light emission pattern storage unit 31, and transmits the light emission patterns to the application server 51ax (Step S1212). The management server 10 then causes the screen generating unit 45 to generate graphics for displaying the light emission patterns of the LEDs on the requested HBA, and outputs the graphics to the terminal device 100 (Step S1213). Subsequent Steps S1208 to S1210 are the same as those described above; therefore, the descriptions thereof are omitted herein.

Effects of First Embodiment

As described above, according to the first embodiment, the light emission patterns in which an abnormal HBA emits light are stored in advance; detection is made as to whether a predetermined HBA is in an abnormal condition; the current light emission patterns in which the LEDs on the abnormal HBA is currently emitting light are obtained for the abnormal HBA that is detected to be in the abnormal condition; if the obtained current light emission patterns do not match any of the stored abnormal light emission patterns, a predetermined command is issued to all of the HBAs except for the abnormal one installed in the application server to cause the LEDs on the HBAs to emit light in predetermined light emission patterns. In this manner, a field engineer can identify the physical location of a failed HBA. In other words, upon identifying the physical location of a failed HBA having the LEDs thereon that cannot be guaranteed to operate according to a command, the LEDs on the HBAs other than that HBA are caused to emit light in predetermined light emission patterns to enable the failed HBA to be distinguished and visually recognized. Therefore, a field engineer can identify the physical location of the failed HBA.

According to another aspect of the present invention, when the LEDs on the HBAs other than the abnormal HBA are caused to emit light in the predetermined light emission patterns, it is alarmed that the LEDs on the HBAs are emitting light in the predetermined light emission patterns. Therefore, a field engineer can reliably identify the physical location of the failed HBA.

[b] Second Embodiment

The first embodiment is explained above; however, the present invention may be implemented as various other embodiments. Therefore, different embodiments of the present invention will be explained below under sections (1) to (7).

(1) Structures of Management Server and Application Server

In the description of the first embodiment, the management server performs a sequence of operations to identify the physical location of an HBA; however, the present invention is not limited thereto. The process performed by the management server may be performed by one of the application servers included in the SAN.

(2) Target of Identification of Physical Location

Furthermore, in the description of the first embodiment, an HBA is the target that is visually recognized by causing the HBA to emit light in predetermined light emission patterns. However, the present invention is not limited thereto. The present invention may be applied to any parts that have a light-emitting component whose emission of light can be controlled. An example of such parts is a network interface card (NIC).

(3) Emission of Light from LEDs

Furthermore, in the description of the first embodiment, the LEDs are caused to emit light in a cycle, according to a predetermined regularity. However, the present invention is not limited thereto. The LEDs may emit light in any way as long as such emission of light enables a field engineer to distinguish a part from others. For example, the color of light may be changed, or light-emitting components may arranged in an array and each thereof may be turned ON or OFF, to allow a field engineer to distinguish the part form others.

(4) Representation of Light Emission Patterns

Furthermore, in the description of the first embodiment, the light emission patterns, displayed on the display of the terminal device 100, are graphically represented. However, the present invention is not limited thereto. The light emission patterns may be represented in any way as long as a person can identify the representation as the actual light emission patterns. For example, a sentence "One second of ON and three second of OFF are repeated" may be displayed.

(5) Alarming Light Emission Patterns

Furthermore, in the description of the first embodiment, when the LEDs on all of the HBAs other than the HBA whose LEDs cannot be guaranteed to operate according to a command are caused to emit light in predetermined patterns, the light emission patterns in which the LEDs on the HBAs other than such an HBA are caused to emit light are alarmed. However, the present invention is not limited thereto. Such a means for alarming the light emission patterns in which the HBAs other than such an HBA is caused to emit light may not be provided.

(6) System Structure, Etc.

Furthermore, in the description of the first embodiment, each of the elements provided in each of the apparatus depicted in the drawings only represents a conceptualized function thereof, and does not necessarily have to be structured physically as depicted in the drawings. In other words, a specific distributive or integrative structure of each of the units is not limited to that depicted in the drawings. For example, the HBA light emission pattern obtaining unit 43 and the second light emission processing unit 44 may be integrated, and whole or any part thereof may be distributed or integrated functionally or physically in any unit depending on various types of loads or usage. Furthermore, each of the processing functions performed in each of the apparatuses may be performed, in whole or any part thereof, by a CPU and a computer program interpreted and executed by the CPU, or as wired logic hardware.

Furthermore, the whole or a part of the processing that is described in the embodiment to be automatically executed may be manually executed, or the whole or a part of the processing that is described to be manually executed may be automatically executed according to a well-known method. For example, according to the embodiment, the graphics are automatically transmitted from the management server 10 to the terminal device 100, and displayed on the display of the terminal device 100. Instead, the screen may be updated when an operator makes a predetermined operation. The processing procedure, the control procedure, the specific names (for example, light emission pattern "a"), information containing various kinds of data and parameters, described herein or in the drawings, may be arbitrarily changed except where specified otherwise.

(7) HBA Management Program

Figure 13:
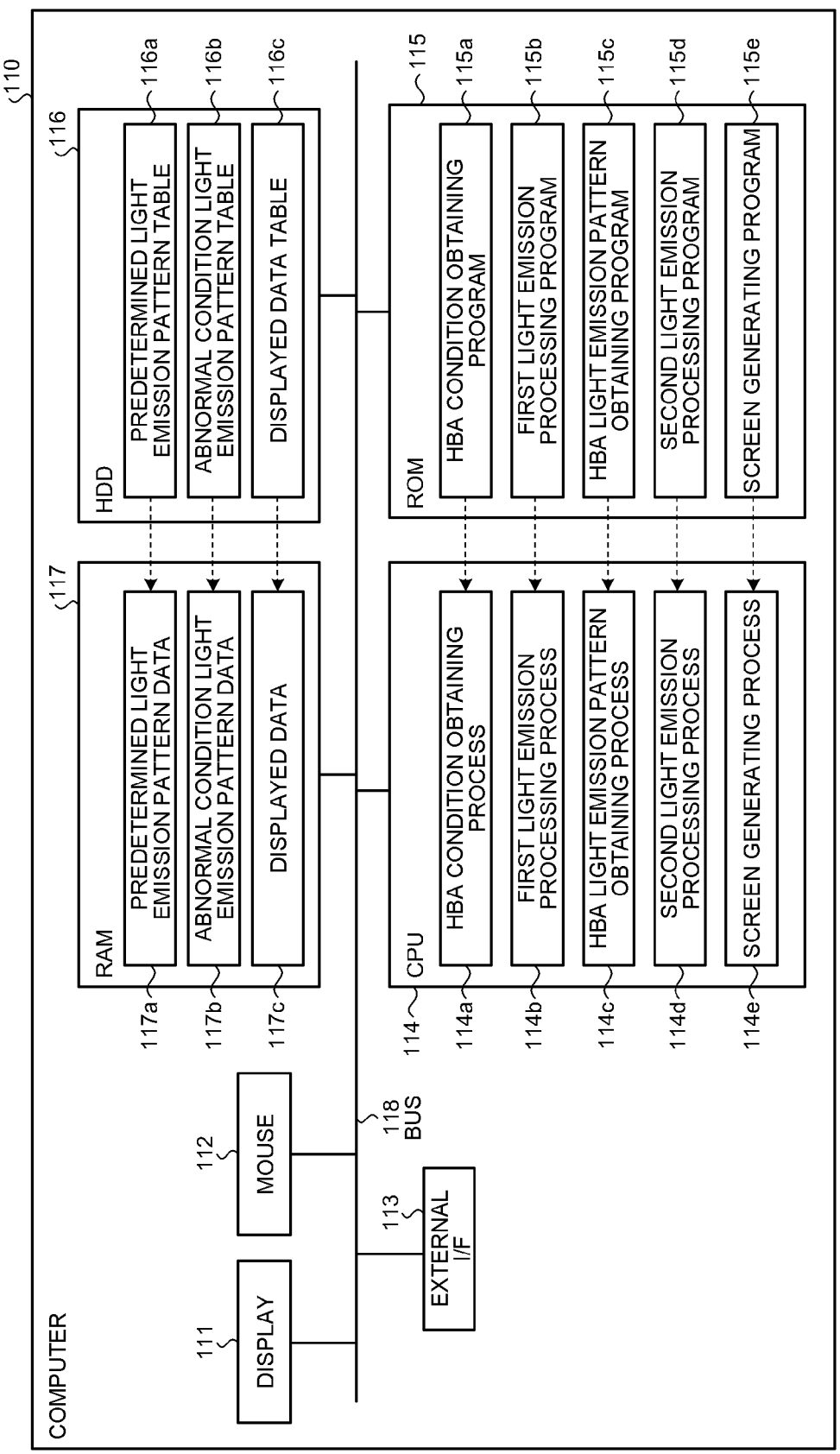
FIG. 13 is a schematic of a computer executing an HBA management program.

According to the first embodiment, various processes are performed by way of hardware logics. However, the present invention is not limited thereto. These processes may also be performed by a computer executing a computer program prepared beforehand. An example of the computer executing an HBA management program, having the same functions as the management server 10 according to the first embodiment, will now be explained with reference to FIG. 13. FIG. 13 is a schematic of a computer executing the HBA management program.

As depicted in FIG. 13, a computer 110 as the management server 10 includes a display 111, a mouse 112, an external I/F 113, a central processing unit (CPU) 114, a read-only memory (ROM) 115, a hard disk drive (HDD) 116 and a random access memory (RAM) 117 connected via a bus 118 and alike.

A replication program having the same function as the management server 10 according to the first embodiment are stored in the ROM 115 in advance. In other words, as depicted in FIG. 13, an HBA condition obtaining program 115a, a first light emission processing program 115b, an HBA light emission pattern obtaining program 115c, a second light emission processing program 115d, and a screen generating program 115e are stored in the ROM 115 in advance. These computer programs 115a to 115e may be integrated or distributed as appropriate, in the same manner as each of the units of the management server 10 depicted in FIG. 3.

The CPU 114 reads the computer programs 115a to 115e from the ROM 115, and execute the same to cause these computer programs 115a to 115e to function as, an HBA condition obtaining process 114a, a first light emission processing process 114b, an HBA light emission pattern obtaining process 114c, a second light emission processing process 114d, and a screen generating process 114e, respectively, as depicted in FIG. 13. These processes 114a to 114e corresponds to the HBA condition obtaining unit 41, the HBA light emission pattern obtaining unit 43, the second light emission processing unit 44, and the screen generating unit 45, depicted in FIG. 3, respectively.

The HDD 116 are provided with, as depicted in FIG. 13, a predetermined light emission pattern table 116a, an abnormal condition light emission pattern table 116b, a displayed data table 116c. The predetermined light emission pattern table 116a, the abnormal condition light emission pattern table 116b, and the displayed data table 116c respectively correspond to the predetermined light emission pattern storage unit 31, the abnormal condition light emission pattern storage unit 32, and the displayed data storage unit 33, depicted in FIG. 3. The CPU 114 then reads predetermined light emission pattern data 117a, abnormal condition light emission pattern data 117b, and displayed data 117c from the predetermined light emission pattern table 116a, the abnormal condition light emission pattern table 116b, and the displayed data table 116c, respectively, and stores the same in the RAM 117. Based on the predetermined light emission pattern data 117a, the abnormal condition light emission pattern data 117b, and the displayed data 117c stored in the RAM 117, the process for identifying the physical location of an HBA is performed.

The computer programs 115a to 115e do not necessarily have to be stored in the ROM 115 from the beginning. For example, the computer 110 can read and execute the computer programs 115a to 115e stored in a portable physical media that is inserted to the computer 110, such as a flexible disk (FD), a compact-disk read-only memory (CD-ROM), a magneto-optical (MO) disk, a digital versatile disk (DVD), or an integrated circuit (IC) card; in a fixed physical media such as a hard disk drive (HDD) installed internally or externally to the computer 110; or in other computers (or servers) that are accessed by the computer 110 via a public line, the Internet, a local area network (LAN) or a wide area network (WAN).

According to the embodiment, a field engineer can identify the physical location of a failed light-emitting component.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer readable storage medium storing a host bus adapter management program which makes a computer that is a management apparatus connected to a server installed with a plurality of host bus adapters that causes light-emitting components thereon to emit light in abnormal light emission patterns indicating an abnormal condition upon falling into the abnormal condition, and to emit light in predetermined light emission patterns corresponding to a predetermined command upon receiving the command, perform:

storing abnormal light emission patterns of the host bus adapters;

detecting an abnormality as to whether a predetermined host bus adapter is in an abnormal condition;

obtaining current light emission patterns of a light-emitting component of an abnormal host bus adapter which is detected to be in the abnormal condition in the detecting, the current light emission patterns representing patterns of actual light emission by a light-emitting component; and controlling light emission by sending the predetermined command to all of the host bus adapters installed in the server except the abnormal host bus adapter to cause the light-emitting components thereof to emit light in the predetermined light emission patterns, when the current light emission patterns, obtained in the obtaining, do not match the abnormal light emission patterns stored in the storing.

2. The computer readable storage medium according to claim 1, wherein the host bus adapter management program further makes the computer perform alarming that the light-emitting components of the host bus adapters are emitting light in the predetermined light emission patterns when all of the host bus adapters except the one in the abnormal condition are controlled to cause the light-emitting components thereof to emit light in the predetermined light emission patterns in the controlling.

3. An apparatus for managing a host bus adapter installed in a server in a plurality and causes light-emitting components thereon to emit light in abnormal light emission patterns indicating an abnormal condition upon falling into the abnormal condition, and to emit light in predetermined light emission patterns corresponding to a predetermined command upon receiving the command, the apparatus comprising:

an abnormal light emission pattern storage unit that stores therein abnormal light emission patterns of the host bus adapters;

an abnormality detecting unit that detects whether a predetermined host bus adapter is in an abnormal condition;

a current light emission pattern obtaining unit that obtains current light emission patterns of a light-emitting component of an abnormal host bus adapter which is detected to be in the abnormal condition by the abnormality detecting unit, the current light emission patterns representing patterns of actual light emission by a light-emitting component; and a light emission controlling unit that controls light emission by sending the predetermined command to all of the host bus adapters installed in the server except the abnormal host bus adapter to cause the light-emitting components thereof to emit light in the predetermined light emission patterns, when the current light emission patterns, obtained by the current light emission pattern obtaining unit, do not match the abnormal light emission patterns stored in the light emission pattern storage unit.

4. A computer readable storage medium storing a light-emitting part management program which makes a computer perform a method for managing a plurality of light-emitting parts that causes light-emitting components thereof to emit light in abnormal light emission patterns indicating an abnormal condition upon falling into the abnormal condition, and to emit light in predetermined light emission patterns corresponding to a predetermined command upon receiving the command, the method comprising:

storing abnormal light emission patterns of the light-emitting parts;

detecting an abnormality as to whether a predetermined light-emitting part is in an abnormal condition;

obtaining current light emission patterns of a light-emitting component of an abnormal light-emitting part which is detected to be in the abnormal condition in the detecting, the current light emission patterns representing patterns of actual light emission by a light-emitting component; and controlling light emission by sending the predetermined command to all of the light-emitting parts except the abnormal light emitting part to cause the light-emitting components thereof to emit light in the predetermined light emission patterns, when the current light emission patterns, obtained in the obtaining, do not match the abnormal light emission patterns stored in the storing.

* * * * *